US009704419B2

(12) United States Patent
Medley

(10) Patent No.: US 9,704,419 B2
(45) Date of Patent: Jul. 11, 2017

(54) MAGNETIC LABEL-STOCK SYSTEMS

(75) Inventor: Keith Medley, Marietta, OH (US)

(73) Assignee: Magnum Magnetics Corporation, Marietta, OH (US)

( * ) Notice: Subject to any disclaimer, the term of this patent is extended or adjusted under 35 U.S.C. 154(b) by 1282 days.

(21) Appl. No.: 13/194,844

(22) Filed: Jul. 29, 2011

(65) Prior Publication Data

US 2011/0287209 A1 Nov. 24, 2011

Related U.S. Application Data

(63) Continuation-in-part of application No. 10/579,786, filed as application No. PCT/US03/04507 on Feb. 19, 2003, said application No. 13/194,844 is a continuation-in-part of application No. 11/655,094, filed on Jan. 19, 2007, now abandoned, which is a continuation-in-part of application No. 10/579,786, filed on Jan. 12, 2011.

(51) Int. Cl.
*B32B 3/16* (2006.01)
*B32B 3/06* (2006.01)
*G09F 7/04* (2006.01)
*G09F 3/02* (2006.01)

(52) U.S. Cl.
CPC .................. *G09F 7/04* (2013.01); *G09F 3/02* (2013.01); *Y10T 428/24008* (2015.01)

(58) Field of Classification Search
CPC .................................... G09F 7/04; G09F 3/02
USPC ........................................................ 428/40.1
See application file for complete search history.

(56) References Cited

U.S. PATENT DOCUMENTS

| | | | | |
|---|---|---|---|---|
| 3,383,121 | A | 5/1968 | Singer | |
| 3,833,448 | A | 9/1974 | Gates et al. | |
| 3,970,506 | A | 7/1976 | Kwan et al. | |
| 4,098,935 | A * | 7/1978 | Knudsen | 428/40.9 |
| 4,104,105 | A | 8/1978 | Rayfield et al. | |
| 4,307,526 | A | 12/1981 | Wippern | |
| 5,232,540 | A | 8/1993 | Southwell et al. | |
| 5,458,282 | A | 10/1995 | Martin | |
| 5,605,730 | A | 2/1997 | Treleaven | |
| 6,153,279 | A | 11/2000 | Charley | |
| 6,228,451 | B1 | 5/2001 | Boudouris et al. | |
| 6,428,869 | B1 | 8/2002 | Ozgen et al. | |
| 6,508,904 | B1 | 1/2003 | Charley | |
| 6,718,673 | B2 | 4/2004 | Ray, III et al. | |
| 6,762,504 | B1 * | 7/2004 | Yamada | 257/782 |
| 7,128,798 | B2 | 10/2006 | Boudouris et al. | |

* cited by examiner

*Primary Examiner* — Victor Chang
(74) *Attorney, Agent, or Firm* — Vorys, Sater, Seymour and Pease LLP; William L. Klima

(57) ABSTRACT

A magnetic label stock tape that is less prone to damage during handling in labeling machines, storage, shipping, etc.

19 Claims, 1 Drawing Sheet

MAGNETIC LABEL-STOCK SYSTEMS

CROSS-REFERENCE TO RELATED APPLICATION

The present application is a continuation-in-part and is related to and claims priority from application Ser. No. 10/579,786, having a 35 U.S.C §371(c) date of Jan. 12, 2011, which application is National Stage Entry claiming benefit from PCT application serial number PCT/US03/04507, filed Feb. 19, 2003, entitled "MAGNETIC LABEL STOCK MATERIAL", and which application is related to and claims priority from prior provisional application Ser. No. 60/358,352, filed Feb. 22, 2002, entitled "MAGNETIC LABEL STOCK MATERIAL"; and the present application is a continuation-in-part and is related to and claims priority from application Ser. No. 11/655,094, filed Jan. 19, 2007, entitled "MAGNETIC LABEL STOCK MATERIAL", the contents of all of which are not admitted to be prior art with respect to the present invention by the mention in this cross-reference section.

BACKGROUND

This invention relates to providing a system for improved magnetic label-stock. More particularly this invention relates to providing a system for preventing damage to backing-tape material. Label applicator machines utilize rolls of label stock to adhere labels to objects passing through the label machine. Label stock comprises a thin backing tape with labels releasably adhered thereto. Labels on label stock do not extend to the full width of the thin backing tape. With thin materials, such as paper, a roll may be tightly wound so that the edges of the thin backing tape form a near-solid side to the roll, thus protecting the edges from damage in shipping, storage, handling, etc. However, with thicker materials, like magnetic labels, the roll cannot be tightly wound, leaving spaces between the coils of the roll at the edges. The space allows the edges to be bend, crushed, torn, creased, distorted, etc., leading to damage which may cause problems in use with label applicator machines (jamming, misfeeds, full tearing across the tape, etc.). Therefore, protection of the edges of such a roll of label stock with labels of thicker materials is needed.

OBJECTS AND FEATURES OF THE INVENTION

A primary object and feature of the present invention is to provide a system overcoming the above-mentioned problem.

It is a further object and feature of the present invention to provide such a system where magnetic labels extend to at least the edges of a release backing tape.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a magnetic label-stock system, relating to damage protection of lateral edges of magnetic label-stock used in at least one labeling machine in adhering at least one flexible magnet to at least one object, providing magnetic attraction to the at least one object, comprising: at least one magnetic label structured and arranged to provide magnetic attraction to the at least one object when adhered to the at least one object; at least one label carrier structured and arranged to carry at least one plurality of such at least one magnetic labels through the at least one labeling machine; wherein such at least one magnetic label comprises at least one adherer structured and arranged to adhere magnetic label to the at least one object and to adhere magnetic label to such at least one label carrier before adhesion to the at least one object; wherein such at least one label carrier comprises at least one adhesion releaser structured and arranged to permit release of adhesion of such at least one magnetic label from such at least one label carrier, permitting adhesion to the at least one object, and at least one carrier geometry comprising a width, a length greater than such width, and two lateral edges running such length; wherein such at least one magnetic label further comprises at least one spanning geometry structured and arranged to substantially span such width of such at least one label carrier; and wherein such two lateral edges are reinforced by such at least one magnetic label against damage.

Moreover, it provides such a magnetic label-stock system wherein such at least one label carrier further comprises at least one translucent tape. Additionally, it provides such a magnetic label-stock system wherein such at least one translucent tape comprises at least one synthetic resin. Also, it provides such a magnetic label-stock system wherein such at least one synthetic resin comprises at least one polyester. In addition, it provides such a magnetic label-stock system wherein such at least one polyester comprises poly (ethylene terephthalate). And, it provides such a magnetic label-stock system wherein such at least one polyester comprises mineral filled polyester.

Further, it provides such a magnetic label-stock system wherein such at least one synthetic resin comprises polyethylene. Even further, it provides such a magnetic label-stock system wherein such at least one synthetic resin comprises polypropylene. Moreover, it provides such a magnetic label-stock system wherein such at least one adherer comprises at least one pressure sensitive adhesive. Additionally, it provides such a magnetic label-stock system further comprising at least one label separation detection permitter structured and arranged to permit detection of at least one separation between two of such at least one magnetic labels by the at least one labeling machine.

In accordance with another preferred embodiment hereof, this invention provides a magnetic label-stock system, relating to damage protection of lateral edges of magnetic label-stock used in at least one labeling machine in adhering at least one flexible magnet to at least one object, providing magnetic attraction to the at least one object, comprising: at least one label release tape; at least one magnetic label adhered to such at least one label release tape; wherein such at least one magnetic label comprises at least one adhesive; wherein such at least one label release tape comprises at least one release surface structured and arranged to permit release of adhesion of such at least one magnetic label from such at least one label release tape, a width, a length greater than such width, and two lateral edges running such length; wherein such at least one magnetic label substantially spans such width of such at least one label release tape; and wherein such two lateral edges are reinforced by such at least one magnetic label against damage.

Also, it provides such a magnetic label-stock system wherein such at least one label release tape further comprises at least one translucent tape. In addition, it provides such a magnetic label-stock system wherein such at least one translucent tape comprises at least one synthetic resin. And, it provides such a magnetic label-stock system wherein such at least one synthetic resin comprises at least one polyester. Further, it provides such a magnetic label-stock system wherein such at least one polyester comprises poly (ethylene terephthalate). Even further, it provides such a magnetic label-stock system wherein such at least one polyester comprises mineral filled polyester.

Even further, it provides such a magnetic label-stock system wherein such at least one synthetic resin comprises at least one synthetic resin selected from a group consisting of: polyethylene and polypropylene. Even further, it provides such a magnetic label-stock system wherein such at least one adhesive comprises at least one pressure sensitive adhesive. Even further, it provides such a magnetic label-stock system further comprising at least one gap between two of such at least one magnetic labels, to permit detection of at least one separation between two of such at least one magnetic labels by the at least one labeling machine.

In accordance with another preferred embodiment hereof, this invention provides a magnetic label-stock system, relating to damage protection of lateral edges of magnetic label-stock used in at least one labeling machine in adhering at least one flexible magnet to at least one object, providing magnetic attraction to the at least one object, comprising: magnetic label means for providing magnetic attraction to the at least one object when on the at least one object; label carrier means for carrying such magnetic label means through the at least one labeling machine; wherein such magnetic label means comprises adherer means for adhering magnetic label means to the at least one object and to adhere magnetic label means to such label carrier means before adhesion to the at least one object; wherein such label carrier means comprises adhesion releaser means for permitting release of adhesion of such magnetic label means from such label carrier means, permitting adhesion to the at least one object, and at least one carrier geometry comprising a width, a length greater than such width, and two lateral edges running such length; wherein such magnetic label means further comprises geometry means for substantially spanning such width of such label carrier means; and wherein such two lateral edges are reinforced by such magnetic label means against damage.

DETAILED DESCRIPTION OF THE BEST MODES AND PREFERRED EMBODIMENTS OF THE INVENTION

Magnetic label-stock system 100 will be described with reference to the figures and drawings.

Figure 1:
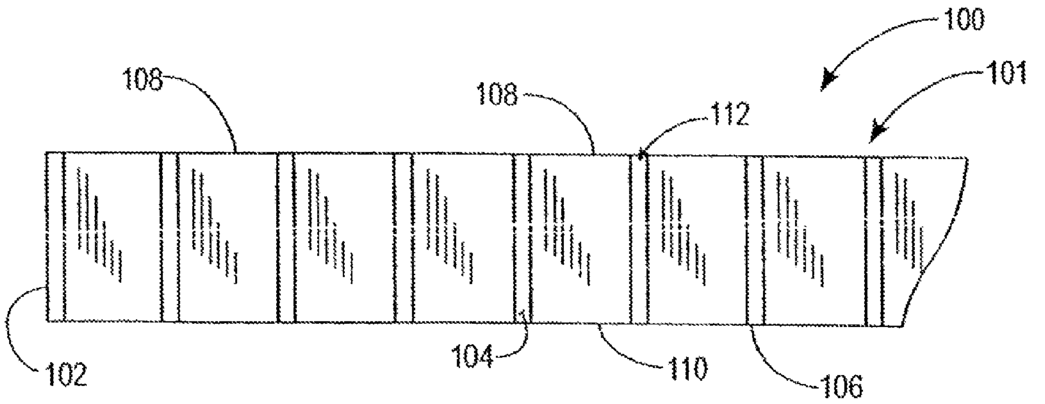
FIG. 1 shows a plan view illustrating magnetic label-stock system according to a preferred embodiment of the present invention.

FIG. 1 shows a plan view illustrating magnetic label-stock system according to a preferred embodiment of the present invention.

As shown in FIG. 1, magnetic label-stock system preferably comprises at least one magnetic label-stock tape 101. Magnetic label-stock tape 101 preferably comprises at least one flexible substrate 102, preferably at least one flexible translucent substrate. Flexible substrate 102 preferably comprises at least one release surface, preferably at least on upper surface 104 (at least embodying herein at least one adhesion releaser structured and arranged to permit release of adhesion of such at least one magnetic label from such at least one label carrier; and at least embodying herein adhesion releaser means for permitting release of adhesion of such magnetic label means from such label carrier means). At least one magnetic label 108 preferably removably adheres to such at least one release surface, preferably upper surface 104. Flexible substrate 102 preferably comprises at least one non-woven web, preferably at least one synthetic resin. Such at least one synthetic resin preferably comprises polyethylene, alternately preferably polypropylene, alternately preferably polyester. A preferred material for flexible substrate 102 is a polyester, e.g., poly (ethylene terepthalate), preferably mineral filled polyester. Upon reading the teachings of this specification, those skilled in the art will now appreciate that, under appropriate circumstances, considering such issues as cost, available materials, future technologies, etc., other flexible substrates, such as, for example, mylar, nylon, other synthetics, etc., may suffice.

Figure 2:
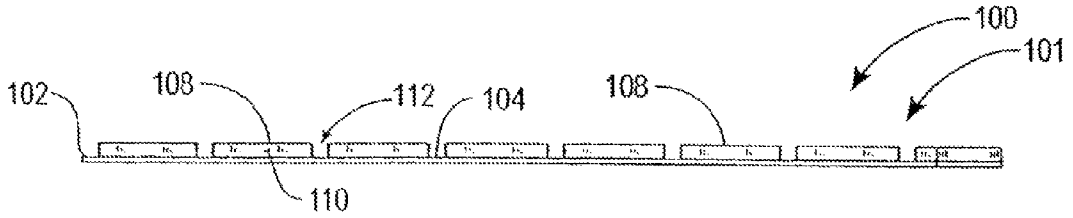
FIG. 2 shows a side elevational view, illustrating magnetic label-stock tape, according to the preferred embodiment of FIG. 1.

FIG. 2 shows a side elevational view, illustrating magnetic label-stock tape, according to the preferred embodiment of FIG. 1.

Flexible substrate 102 alternately preferably comprises paper, preferably having a release coating, preferably at least one silicon coating, on upper surface 104, as shown in FIG. 2. Upon reading the teachings of this specification, those skilled in the art will now appreciate that, under appropriate circumstances, considering such issues as cost, available materials, future technologies, etc., other substrate materials, such as, for example, cloth with release coatings, other woven substrates with or without release coatings, flexible metal substrates, etc., may suffice.

Magnetic labels 108 (at least embodying herein magnetic label means for providing magnetic attraction to the at least one object when on the at least one object) may be any conventional flexible magnetic label. Such labels are made from suspensions of magnetizable material, preferably at least one ferrite, dispersed in at least one flexible synthetic resin, alternately preferably at least one rubber binder, and preferably subsequently magnetized. Such flexible magnetic labels are well-known and widely used. Magnetic labels 108 range from about 0.006 inches to about 0.060 inches in thickness.

Magnetic labels 108 are preferably adhered to upper surface 104 of flexible substrate 102 (at least embodying herein at least one label carrier structured and arranged to carry at least one plurality of such at least one magnetic labels through the at least one labeling machine; and at least embodying herein label carrier means for carrying such magnetic label means through the at least one labeling machine), preferably with a thin layer of at least one pressure-sensitive adhesive (not shown) on the back of each magnetic label 108 (at least herein embodying wherein such at least one magnetic label comprises at least one adherer structured and arranged to adhere magnetic label to the at least one object and to adhere magnetic label to such at least one label carrier before adhesion to the at least one object; and at least herein embodying wherein such magnetic label means comprises adherer means for adhering magnetic label means to the at least one object and to adhere magnetic label means to such label carrier means before adhesion to the at least one object). Magnetic labels 108 are preferably spaced along the longitudinal direction of flexible substrate 102 with small intervals 112 between them. Flexible substrate 102 preferably is translucent (at least herein embodying wherein such at least one label carrier further comprises at least one translucent tape). Accordingly, the conventional optical sensing devices that control the movement of magnetic label-stock tape 101 through a labeling machine can operate in a normal fashion. This arrangement at least embodies herein at least one label separation detection permitter structured and arranged to permit detection of at least one separation between two of such at least one magnetic labels by the at least one labeling machine.

Magnetic labels 108 and flexible substrate 102 preferably comprise a substantially equal width, preferably an equal width. For clarity, width comprises a dimension in magnetic label-stock tape 101, with respect to the lateral direction of flexible substrate 102, at right angles to the longitudinal direction of flexible substrate 102. Accordingly, magnetic labels 108 are sized to extend substantially to both lateral edges 106 of flexible substrate 102 (this arrangement at least herein embodying wherein such at least one magnetic label further comprises at least one spanning geometry structured and arranged to substantially span such width of such at least one label carrier; and at least herein embodying wherein such magnetic label means further comprises geometry means for substantially spanning such width of such label carrier means). Consequently, lateral edges 106 (at least embodying herein two lateral edges running such length), being relatively thin and delicate when unsupported, are supported along most of their length by lateral edges 110 of magnetic labels 108 (this arrangement at least herein embodying wherein such two lateral edges are reinforced by such at least one magnetic label against damage; and at least herein embodying wherein such two lateral edges are reinforced by such magnetic label means against damage). Applicant has discovered that this tends to prevent crushing, distortion, or tearing of flexible substrate 102 when a coil of magnetic label-stock tape 101 is distributed and handled. Additionally, this arrangement of magnetic labels 108 also allows the edge guides in the label application machine to bear, for the most part, on lateral edges 110 of magnetic labels 108 and the portion of lateral edges 106 of flexible substrate 102 reinforced by contact with magnetic labels 108. Accordingly, Applicant has found that magnetic label-stock tape 101 tends to run more smoothly through the label application machine.

Figure 3:
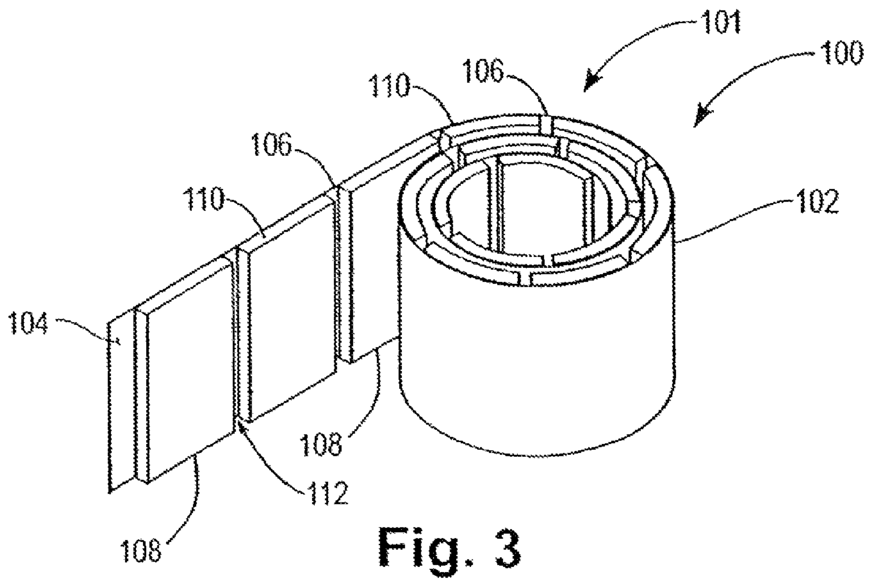
FIG. 3 shows a perspective view, illustrating a coil of the magnetic label-stock tape, according to the preferred embodiment of FIG. 2.

FIG. 3 shows a perspective view, illustrating a coil of the magnetic label-stock tape, according to the preferred embodiment of FIG. 2. When magnetic label-stock tape 101 is coiled for shipping, distribution, etc., as shown in FIG. 3, lateral edges 110 of the magnetic labels 108 preferably substantially coincide with lateral edges 106 of flexible substrate 102. Consequently, lateral edges 106 of flexible substrate 102 are preferably largely protected from damage in handling and use. The propensity for damaging upon handling of the conventional magnetic label stock materials, have now been alleviated by the innovations of the invention, which Applicant attributes to magnetic labels 108 extending substantially to lateral edges 106 of flexible substrate 102 in a system comprising: a flexible translucent release tape having magnetic labels adhered thereto with a pressure sensitive adhesive, the magnetic labels being spaced along such tape with light-transmissive gaps there between, and the magnetic labels extending substantially to the edges of such tape.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A magnetic label-stock system, relating to damage protection of lateral edges of magnetic label-stock used in at least one labeling machine in adhering at least one flexible magnet to at least one object, providing magnetic attraction to the at least one object, comprising:

a) at least one magnetic label structured and arranged to provide magnetic attraction to the at least one object when adhered to the at least one object;

b) at least one label carrier structured and arranged to carry at least one plurality of said at least one magnetic labels through the at least one labeling machine;

c) wherein said at least one magnetic label comprises at least one adherer structured and arranged to adhere magnetic label to the at least one object and to adhere magnetic label to said at least one label carrier before adhesion to the at least one object;

d) wherein said at least one label carrier comprises i) at least one adhesion releaser structured and arranged to permit release of adhesion of said at least one magnetic label from said at least one label carrier, permitting adhesion to the at least one object, and ii) at least one carrier geometry comprising (1) a width, (2) a length greater than said width, and (3) two lateral edges running said length;

e) wherein said at least one magnetic label further comprises at least one spanning geometry structured and arranged to substantially span said width of said at least one label carrier; and f) wherein said two lateral edges are reinforced by said at least one magnetic label against damage.

2. The magnetic label-stock system according to claim 1 wherein said at least one label carrier further comprises at least one translucent tape.

3. The magnetic label-stock system according to claim 2 wherein said at least one translucent tape comprises at least one synthetic resin.

4. The magnetic label-stock system according to claim 3 wherein said at least one synthetic resin comprises at least one polyester.

5. The magnetic label-stock system according to claim 4 wherein said at least one polyester comprises poly (ethylene terephthalate).

6. The magnetic label-stock system according to claim 4 wherein said at least one polyester comprises mineral filled polyester.

7. The magnetic label-stock system according to claim 3 wherein said at least one synthetic resin comprises polyethylene.

8. The magnetic label-stock system according to claim 3 wherein said at least one synthetic resin comprises polypropylene.

9. The magnetic label-stock system according to claim 1 wherein said at least one adherer comprises at least one pressure sensitive adhesive.

10. The magnetic label-stock system according to claim 1 further comprising at least one label separation detection permitter structured and arranged to permit detection of at least one separation between two of said at least one magnetic labels by the at least one labeling machine.

11. A magnetic label-stock system, relating to damage protection of lateral edges of magnetic label-stock used in at least one labeling machine in adhering at least one flexible magnet to at least one object, providing magnetic attraction to the at least one object, comprising:

a) at least one label release tape;

b) at least one magnetic label adhered to said at least one label release tape;

c) wherein said at least one magnetic label comprises at least one adhesive;

d) wherein said at least one label release tape comprises i) at least one release surface structured and arranged to permit release of adhesion of said at least one magnetic label from said at least one label release tape, ii) a width, iii) a length greater than said width, and iv) two lateral edges running said length;

e) wherein said at least one magnetic label substantially spans said width of said at least one label release tape; and f) wherein said two lateral edges are reinforced by said at least one magnetic label against damage.

12. The magnetic label-stock system according to claim 11 wherein said at least one label release tape further comprises at least one translucent tape.

13. The magnetic label-stock system according to claim 12 wherein said at least one translucent tape comprises at least one synthetic resin.

14. The magnetic label-stock system according to claim 13 wherein said at least one synthetic resin comprises at least one polyester.

15. The magnetic label-stock system according to claim 14 wherein said at least one polyester comprises poly (ethylene terephthalate).

16. The magnetic label-stock system according to claim 14 wherein said at least one polyester comprises mineral filled polyester.

17. The magnetic label-stock system according to claim 13 wherein said at least one synthetic resin comprises at least one synthetic resin selected from a group consisting of:

a) polyethylene and b) polypropylene.

18. The magnetic label-stock system according to claim 11 wherein said at least one adhesive comprises at least one pressure sensitive adhesive.

19. The magnetic label-stock system according to claim 11 further comprising at least one gap between two of said at least one magnetic labels, to permit detection of at least one separation between two of said at least one magnetic labels by the at least one labeling machine.

* * * * *